Jan. 10, 1939.  R. F. HOLMES  2,143,151
REFLECTOR SIGNAL
Filed June 6, 1936

Inventor
Russell F. Holmes

Patented Jan. 10, 1939

2,143,151

UNITED STATES PATENT OFFICE 2,143,151

REFLECTOR SIGNAL

Russell F. Holmes, Flint, Mich., assignor to General Motors Corporation, Detroit, Mich., a corporation of Delaware Application June 6, 1936, Serial No. 83,835

3 Claims. (Cl. 88—82)

This invention has to do with a back-reflecting device of the type used for road signs and on the rear of vehicles to return to the driver of a following car some of the light from his own headlamps to give him the desired indication. The invention relates to the type of back-reflecting device in which a lens is arranged in advance of a reflector so as to focus incident light thereon, the reflector returning the light, and the lens redirecting it in a direction parallel to the direction of incidence.

Figure 1:
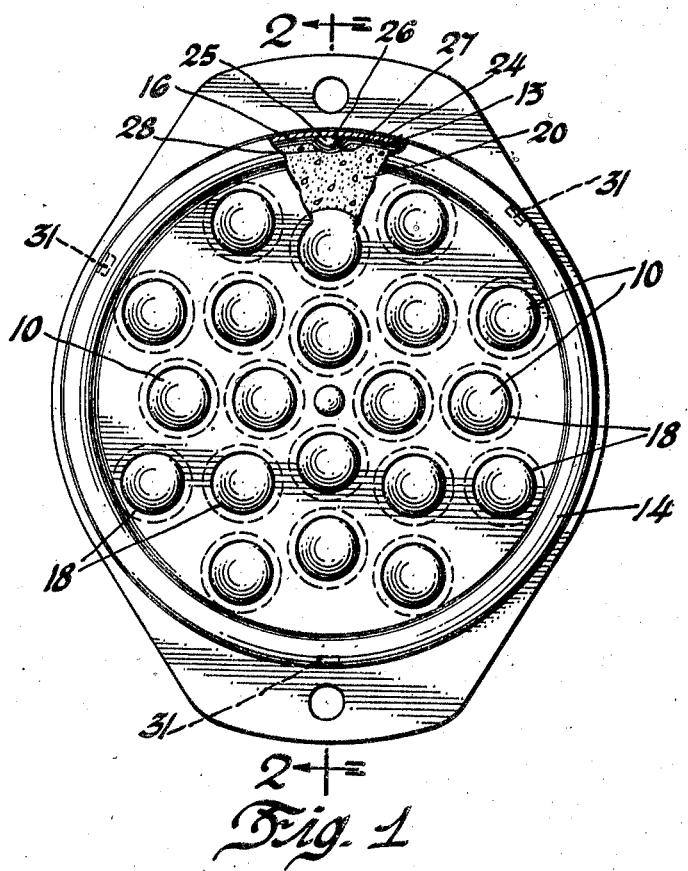
Figure 2:
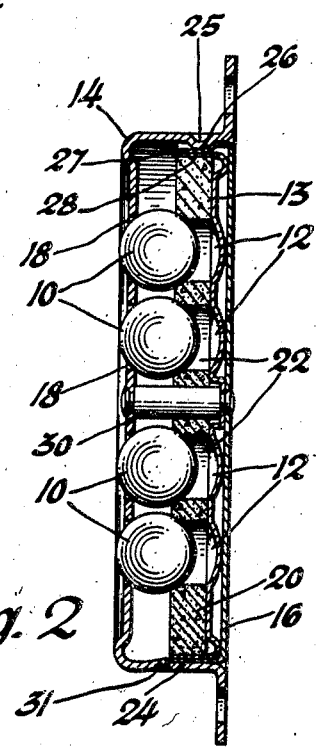

The invention has to do with a simple economical assembly of lens and reflector which will be best understood by reference to the drawing in which Figure 1 is a front view of the improved reflector, and Figure 2 is a vertical section on line 2—2 thereof.

The lens preferably takes the form of a ball indicated at 10, although, if desired, conventional types of lenses may be employed, either of the double convex or plano-convex type. At the foci of the lenses are provided reflectors 12 which are of spherical contour and are preferably formed by pressing out of a single sheet of metal indicated at 13.

14 and 16 indicate cooperating pressed metal housings, preferably having telescoped flanges as shown. The housing 14 is provided with apertures 18 in which the lenses 10 are seated as shown, and over the lenses is placed a gasket 20 having apertures 22 therein alined with the apertures 18 in the housing member 14. Over the gasket is placed the reflector sheet 13 which preferably is provided with a flange 24 enabling the gasket to be assembled with the reflector prior to its introduction into the housing. Dent 25 in housing 14 with cooperating groove 26 in housing 16, groove 27 in flange 24 of reflector 13, and groove 28 in gasket 20 provide proper registration of parts.

The gasket 20 is preferably made of cork or of rubber of such composition as to not injuriously affect the reflector.

Over the reflector is placed the housing member 16, the flange of this member telescoping over the flange on the reflector and within the flange on the housing member 14. The two housing members are secured together by spacer 30 having shoulders as shown engaging the rear face of housing member 14 and the front face of reflector 13, gasket 20 being perforated to permit passage of the spacer. The spacer has reduced extremities extending at one end through the front housing member and at the other end through the reflector and rear housing member. With the parts pressed together as shown the extremities are headed over securing the parts together with the proper spacing between the balls and the reflector.

With the described arrangement the gasket 20 makes sealing contact with the lenses and with the metal of the reflector sheet 13 surrounding the reflector portions 12. Thus each of the reflectors is individually sealed against the entrance of dust and moisture. At the same time the gasket is preferably of sufficiently resilient construction so as to hold the balls firmly seated against the apertures in the plate 14.

Of course, if desired, the gasket 20 could be made of a number of parts as could also the reflecting sheet 13, but the described arrangement is preferable from the standpoint of durability and economy.

If desired, portions of the flange of housing 14 may be pressed in as at 31 to form stops. In assembly the reflector 13 is positioned with its edges in engagement with the stops, and when so positioned the reflectors are at the foci of the lenses 10.

I claim:

1. The combination of a housing member having a plurality of apertures therein, lenses seated in said apertures, yieldable gasket means at the rear of the housing member provided with apertures in which the lenses are seated, a reflector in the rear of the gasket means and comprising a plurality of spherical reflecting surfaces registering with the apertures and surrounding portions engaging the gasket means in sealing relation, whereby each of said reflecting surfaces is individually sealed against the entrance of dust, said housing member and reflector being provided with telescoping flanges, and means for holding the parts in assembled relation.

2. The combination of a housing member having a plurality of apertures therein, lenses seated in said apertures, yieldable gasket means at the rear of the housing member provided with apertures in which the lenses are seated, a reflector in the rear of the gasket means and comprising a plurality of spherical reflecting surfaces registering with the apertures and surrounding portions engaging the gasket means in sealing relation, whereby each of said reflecting surfaces is individually sealed against entrance of dust, a second housing member covering the rear of said reflector, said housing members being provided with telescoping flanges, and means for holding said parts in assembled relation.

3. The combination of a housing member having a plurality of apertures therein, lenses seated in said apertures, yieldable gasket means at the rear of the housing member provided with apertures in which the lenses are seated, a reflector in the rear of the gasket means and comprising a plurality of spherical reflecting surfaces registering with the apertures and surrounding portions engaging the gasket means in sealing relation, whereby each of said reflecting surfaces is individually sealed against entrance of dust, a second housing member covering the rear of said reflector, said housing members and reflector being provided with telescoping flanges, and means for holding said parts in assembled relation.

RUSSELL F. HOLMES.